US010630533B2

(12) United States Patent
Thubert et al.

(10) Patent No.: US 10,630,533 B2
(45) Date of Patent: Apr. 21, 2020

(54) DISTRIBUTED NETWORK QUERY USING WALKER AGENTS

(71) Applicant: Cisco Technology, Inc., San Jose, CA (US)

(72) Inventors: Pascal Thubert, La Colle sur Loup (FR); Eric Levy-Abegnoli, Valbonne (FR); Patrick Wetterwald, Mouans Sartoux (FR); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 15/785,833

(22) Filed: Oct. 17, 2017

(65) Prior Publication Data

US 2019/0013996 A1    Jan. 10, 2019

Related U.S. Application Data

(60) Provisional application No. 62/529,644, filed on Jul. 7, 2017.

(51) Int. Cl.
*G06F 13/00* (2006.01)
*H04L 12/24* (2006.01)
*H04L 29/08* (2006.01)

(52) U.S. Cl.
CPC ........ *H04L 41/048* (2013.01); *H04L 41/0853* (2013.01); *H04L 67/12* (2013.01); *H04L 67/327* (2013.01)

(58) Field of Classification Search
CPC ... H04L 67/12; H04L 67/327; H04L 41/0853; H04L 41/048

(Continued)

(56) References Cited

U.S. PATENT DOCUMENTS 10,341,199 B2 *  7/2019  Peri ..................... H04L 41/5045
2015/0026323 A1 *  1/2015  Peri ..................... H04L 41/5045
                                                                709/223

(Continued)

FOREIGN PATENT DOCUMENTS

CN          101883444 B        1/2013

OTHER PUBLICATIONS

Barnett, Gary., "Managing Data in the Internet of Things", https://hotdesks.org/docs/Managing-Data-in-the-Internet-of-Things.pdf, 2014, 15 pages, Ovum.

(Continued)

*Primary Examiner* — Kenneth R Coulter

(74) *Attorney, Agent, or Firm* — Behmke Innovation Group LLC; James M. Behmke; Jonathon P. Western

(57) ABSTRACT

In one embodiment, a device in a network receives a query walker agent configured to query information from a distributed set of devices in the network based on a query. The device executes the query walker agent to identify the query. The device updates state information of the executing query walker agent using local information from the device and based on the query. The device unloads the executing query walker agent after updating the state information. The device propagates the query walker agent with the updated state information to one or more of the distributed set of devices in the network, when the updated state information does not fully answer the query.

18 Claims, 16 Drawing Sheets

(58) Field of Classification Search
USPC .............. 709/201, 202, 238, 239; 707/770, 707/713–719
See application file for complete search history.

(56) References Cited

U.S. PATENT DOCUMENTS

| | | | |
|---|---|---|---|
| 2016/0255155 A1* | 9/2016 | Green | H04W 4/70 709/225 |
| 2016/0294950 A1* | 10/2016 | Green | H04W 4/70 |
| 2017/0126578 A1 | 5/2017 | Amulothu et al. | |
| 2017/0187807 A1 | 6/2017 | Clernon | |
| 2018/0032863 A1* | 2/2018 | Graepel | G06N 3/04 |
| 2018/0032864 A1* | 2/2018 | Graepel | G06N 3/0427 |

OTHER PUBLICATIONS

Flaherty, Nick., "Peer-to-peer database simplifies IoT smart data discovery", http://www.edn.com/electronics-products/other/4427851/Peer-to-peer-database-simplifies-IoT-smart-data-discovery, 2 pages, 2014, AspenCore.

Sahuguet, et al., "Distributed Query Optimization: Can Mobile Agents Help?", Unpublished draft, 6 pages, 2000.

* cited by examiner

DISTRIBUTED NETWORK QUERY USING WALKER AGENTS

RELATED APPLICATION

This application claims priority to U.S. Provisional Patent Appl. No. 62/529,644, filed on Jul. 7, 2017, entitled DISTRIBUTED NETWORK QUERY USING WALKER AGENTS, by Thubert, et al., the contents of which are incorporated herein by reference.

TECHNICAL FIELD

The present disclosure relates generally to computer networks, and, more particularly, to a distributed network query using walker agents.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

An example implementation of an LLN is the "Internet of Things" (IoT), which may be used by those in the art to refer to uniquely identifiable objects/things and their virtual representations in a network-based architecture. In particular, the IoT involves the ability to connect more than just computers and communications devices, but rather the ability to connect "objects" in general, such as lights, appliances, vehicles, window shades and blinds, doors, locks, etc.

Many traditional computing approaches are not applicable to LLNs and the IoT. For example, to optimize a metric along a path using a traditional routing approach, the prerequisite is that the topology and the relevant metric are known by the device performing the computation. However, the limitations of many LLN devices in terms of memory capacity, duty cycle, etc., often make such computations impossible.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
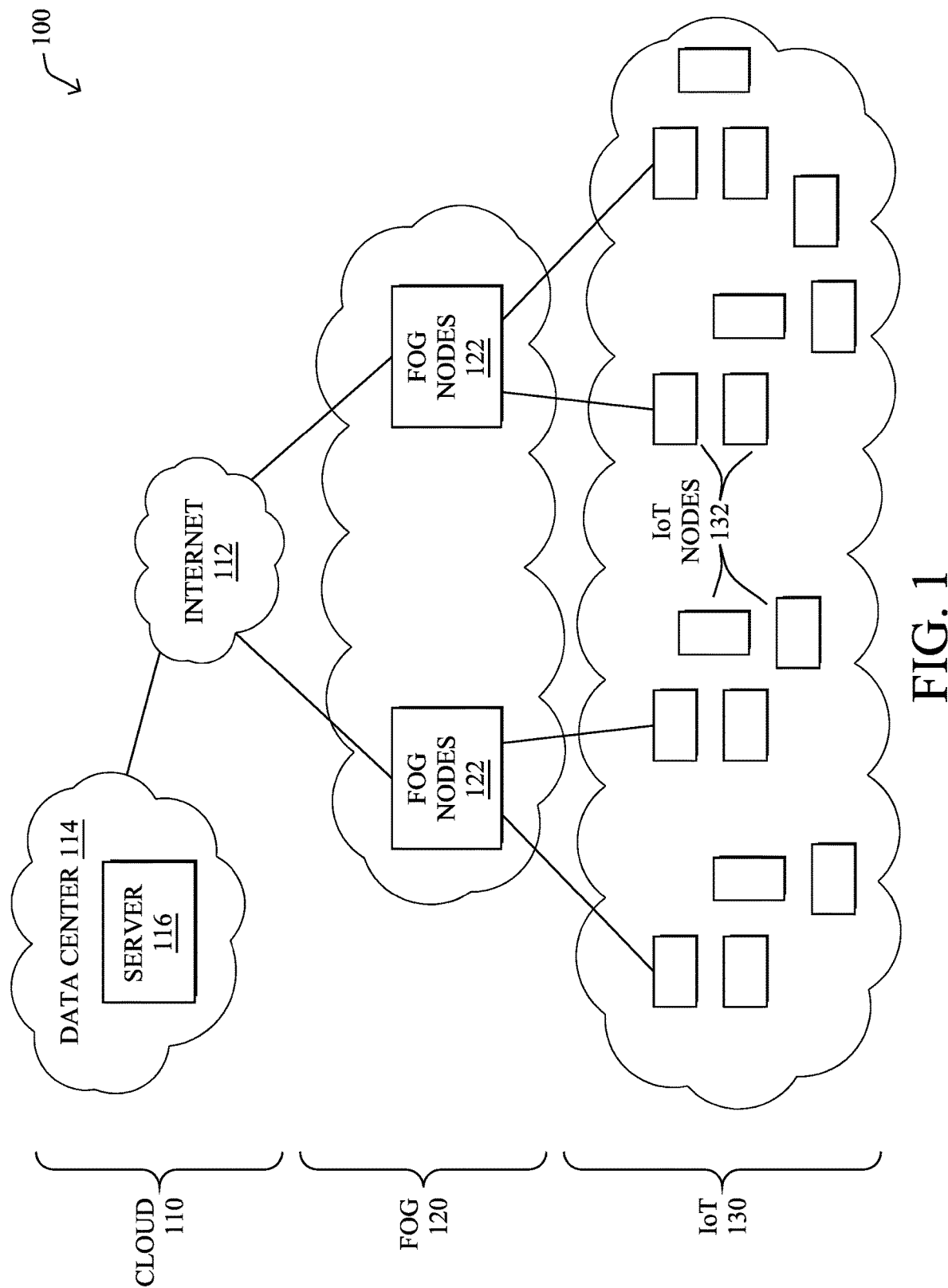
FIG. 1 illustrate an example communication network.

According to one or more embodiments of the disclosure, a device in a network receives a query walker agent configured to query information from a distributed set of devices in the network based on a query. The device executes the query walker agent to identify the query. The device updates state information of the executing query walker agent using local information from the device and based on the query. The device unloads the executing query walker agent after updating the state information. The device propagates the query walker agent with the updated state information to one or more of the distributed set of devices in the network, when the updated state information does not fully answer the query.

In further embodiments, a node in a network receives a query for information available from a distributed set of devices in the network. The node generates a query walker agent configured for execution by the devices in the distributed set of devices to answer the query using the information available from the distributed set of devices. The node sends the query walker agent to at least one of the devices in the distributed set of devices. The at least one device updates state information of the query walker agent and propagates the query walker agent to one or more other devices of the distributed set. The node receives an answer to the query from a particular one of the distributed set of devices based on the updated state information of the query walker agent.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
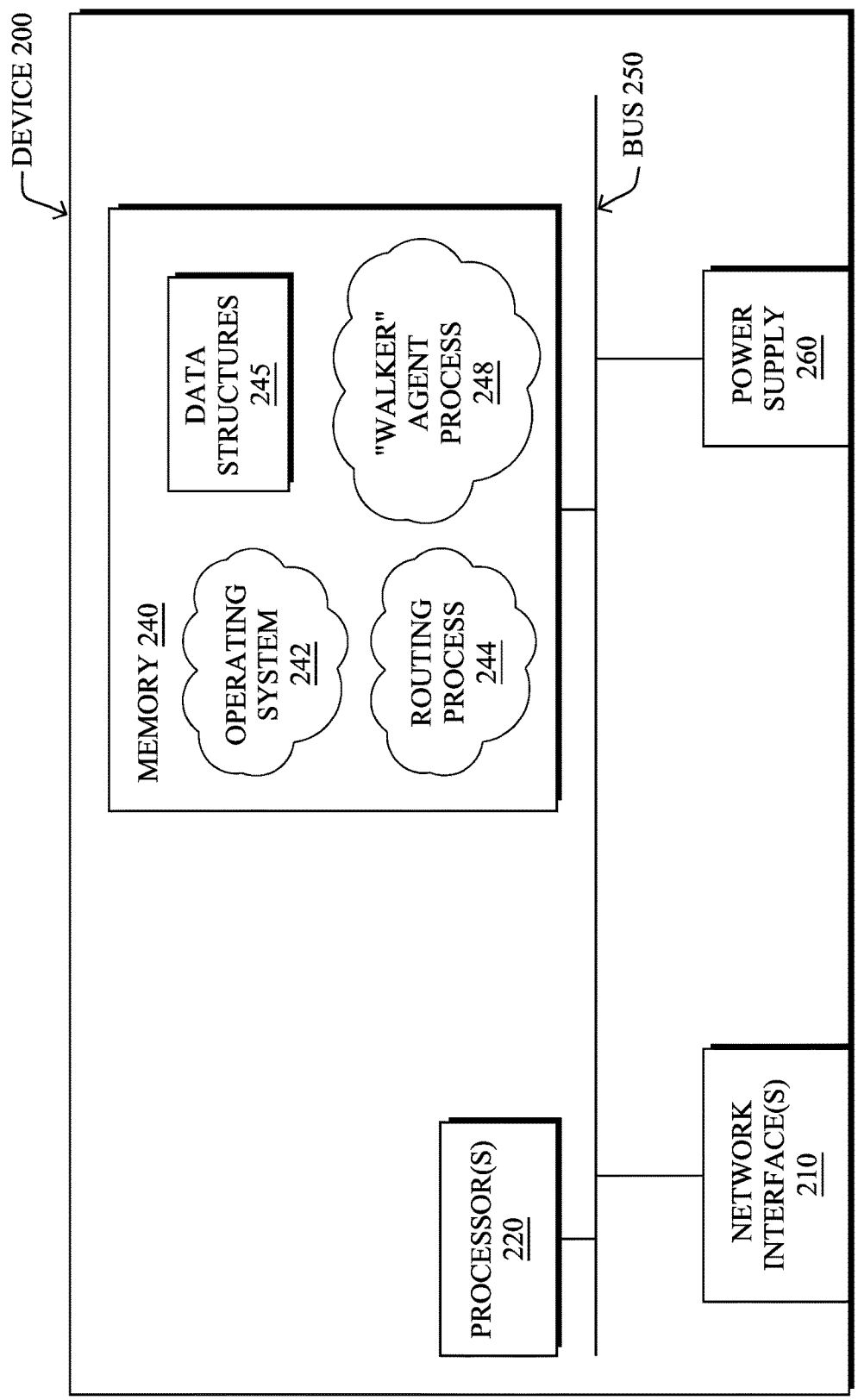
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative "walker" agent process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as an Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Intelligent Walker Agents in a Network

As noted above, many devices/nodes in constrained networks, such as LLNs and the IoT, have very limited resources in terms of available memory, processing power, power source (e.g., battery charge, etc.), and the like. Accordingly, such devices may not be able to locally perform many computationally-intensive tasks. This is particularly true in cases in which the processing device/node is required to maintain state information for multiple devices/nodes in the network.

To address the various limitations of constrained devices in certain networks, existing approaches rely on the deployed devices leveraging a more capable device to perform the computations. For example, the devices in the network could offload the computations to a remote server or cloud-based service outside of the local network. However, doing so also increases the amount of bandwidth consumed to relay the information to and from such a server or service (e.g., via a WAN connection). A more recent evolution proposes the use of the local networking devices, such as edge routers, to perform the computations in the "fog."

According to various embodiments, the concept of a "walker agent" is introduced herein and offers yet another alternative approach to performing more complex computations in a network of constrained devices/nodes. In general, a walker agent refers to a software agent that loads and executes on a particular device/node in a network, updates state information for its computation during execution, passes both its executable code and updated state information to the next device/node in the network for execution, and then unloads/removes its local copy of the agent. In other words, execution of a walker agent "hops" from one device in the network to the next, while maintaining the state information for its computations during these transfers.

FIGS. 3A-3D illustrate examples of a walker agent being passed from one device/node to another in a network. As shown, consider the case of two devices, device 302a and device 302b, both located in a network 300. In some cases, devices 302a-302b may be neighboring devices having a direct communication link there between. In other cases, devices 302a-302b may be separated by any number of intermediate devices that relay communications between devices 302a-302b.

During operation, device 302a may receive walker agent 304 from another device in the network, such as a neighbor of device 302a, another constrained device along a routing path in the network, or from a supervisory device that provides administrative control over device 302a. In various embodiments, walker agent 304 may comprise executable code 306, as well as state information 308.

Figure 3A:
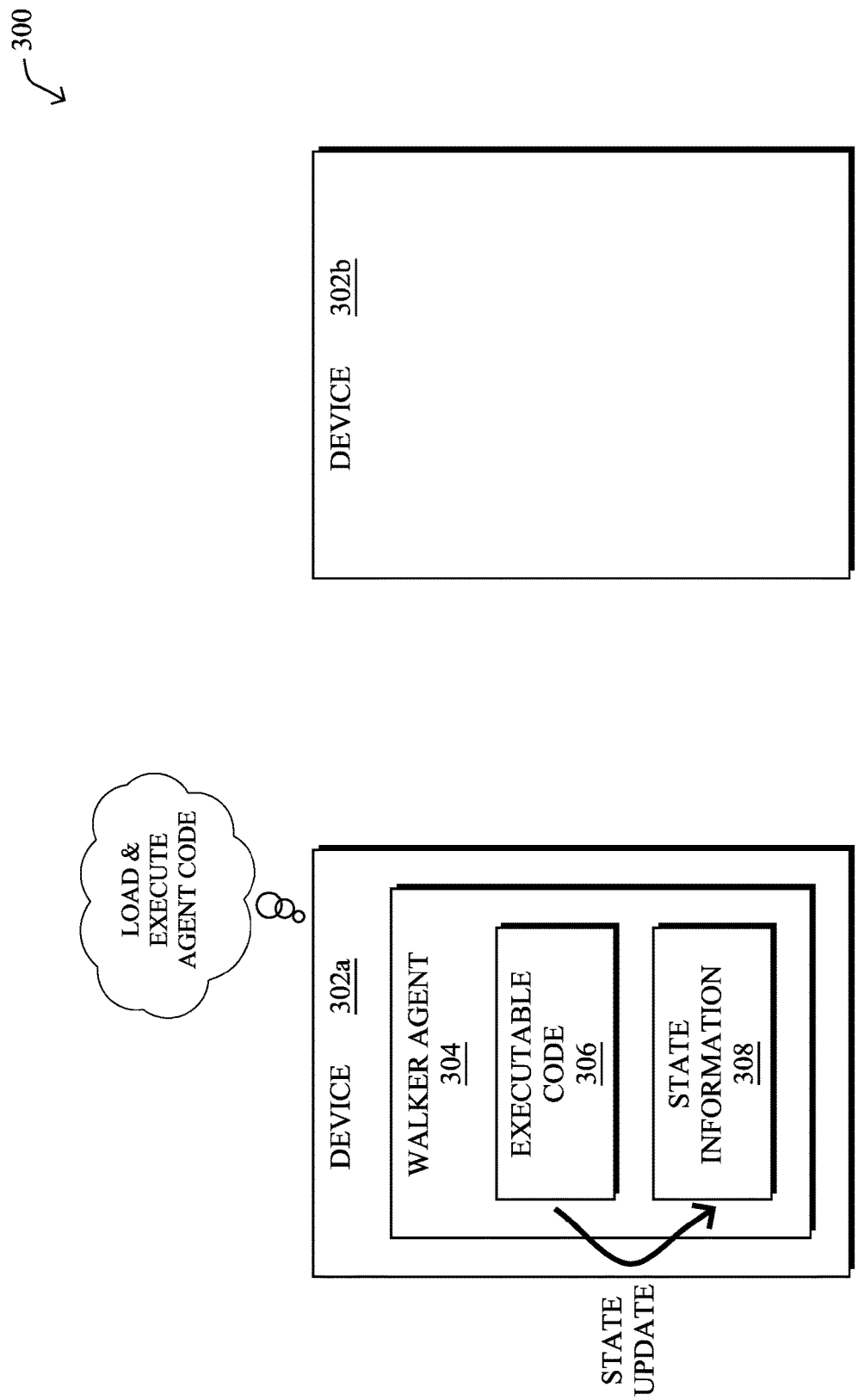
FIGS. 3A-3D illustrate examples of a walker agent being passed from one device/node to another in a network.

As shown in FIG. 3A, device 302a may load executable code 306 which performs a particular computation for which it was configured and updates state information 308, accordingly. Generally, state information 308 may be a set of one or more parameter values that reflect the current state of the computation performed by executable code 306. Such values may be one or more observations about device 302a (e.g., the neighbors of device 302a, the signal strengths to the neighbors, etc.), the portion of network 300 around device 302a, and/or computed values derived therefrom (e.g., averages, statistics, maxima or minima, gradients, etc.).

For example, assume that executable code 306 is configured to calculate an optimal value or running total at each hop or at specific points along a networking path, based on the locally observable value(s) at each device. In such a case, when device 302a receives walker agent 304, it may load and execute executable code 306 of walker agent 304, to retrieve its own locally observable value(s), perform the associated computations on them, and update state information 308, accordingly.

Figure 3B:
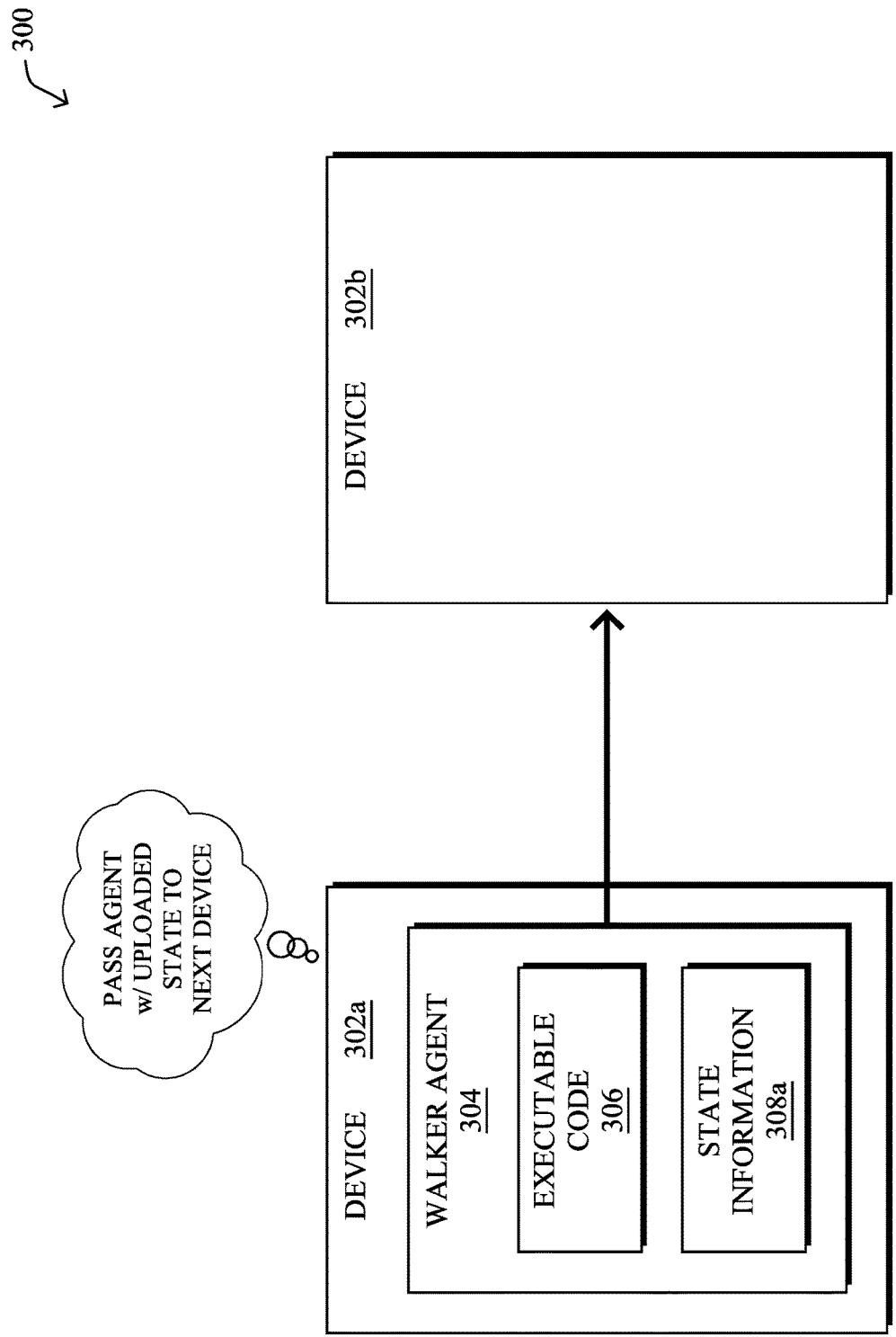
Figure 3C:
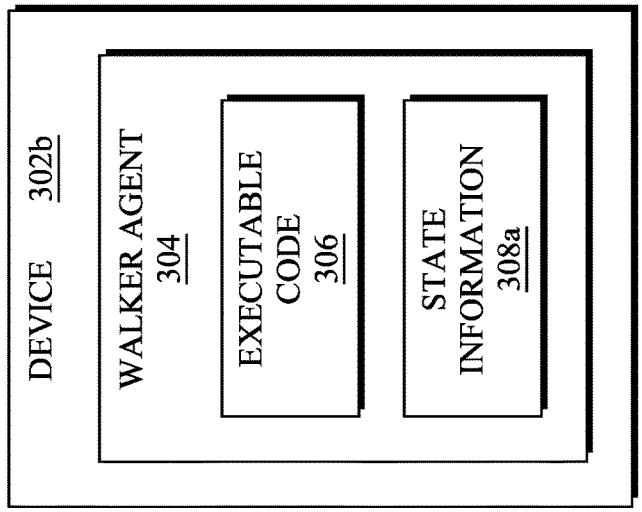
Figure 3C:
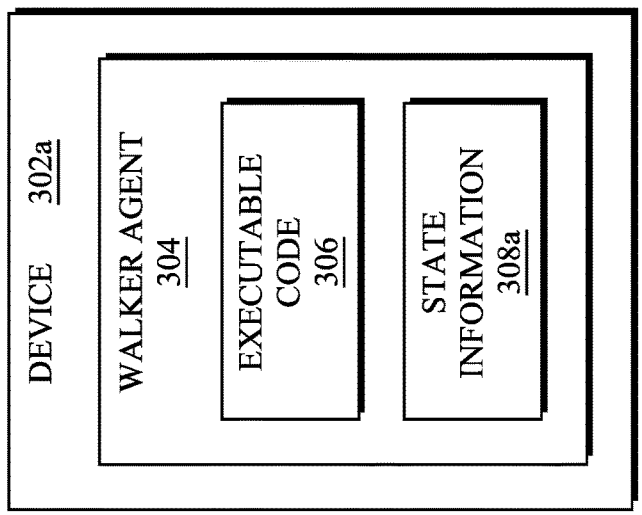

As shown in FIGS. 3B-3C, once device 302a has executed walker agent 304, thereby updating state information 308 into updated state information 308a, device 302a may send walker agent 304 to device 302b. In doing so, when device 302b executes code 306 of walker agent 304, walker agent 304 is able to continue its computation from the point at which it left off on device 302a. In other words, device 302b may then load walker agent 304 and update state information 308a using its own local information. Once completed, device 302b may then send walker agent 304 on to the next device in the network, to repeat the process.

Figure 3D:
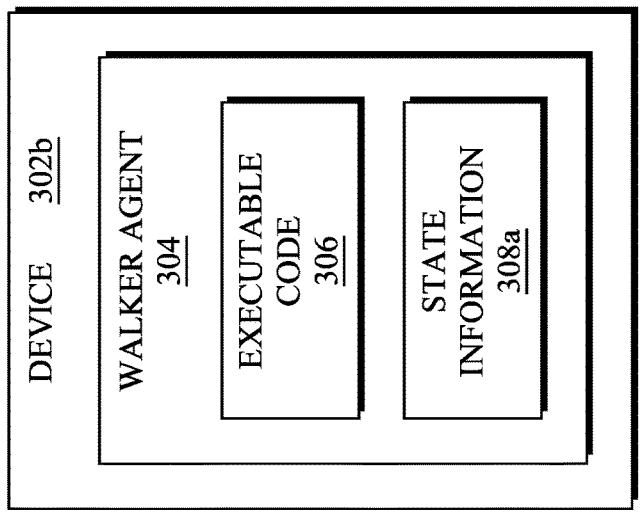
Figure 3D:

In FIG. 3D, another key aspect of a walker agent is that its execution may "hop" from device to device in the network, in various embodiments. Notably, after walker agent 304 has been passed to device 302b, device 302a may unload walker agent 304 from its local system, thereby freeing up resources on device 302a. In some embodiments, this may entail deleting or otherwise removing walker agent 304 from 302a after walker agent 304 has been passed to device 302b for execution. In other words, at any given time, a walker agent may be executed by a subset of one or more devices in the network that changes over the course of time as the executing device(s) complete their computations.

As noted above, many nodes/devices in LLNs and IoT networks are highly constrained in terms of resources and capabilities. Accordingly, with respect to extracting data from these nodes, the classical model is to have the nodes send data back to a centralized database in the cloud. Queries can then be run against this database in an offline manner. For example, a temperature sensor in the network may pass temperature readings back to a cloud-based management system, allowing outside devices to access this reading via the cloud-based management system. However, in an LLN/IoT network where the data evolves rather quickly, but is rarely provided to the central database, this model will waste constrained node resources, such as bandwidth and energy. Thus, it may be more efficient in some cases to obtain the data directly from the network nodes themselves on demand. But, a reactive trigger that tells all nodes to send all data needed for a query may also cause congestion and loss.

Distributed Network Query Using Walker Agents

The techniques herein also introduce a query walker agent that allows a network, such as an Internet of Things (IoT) network to be used as a quasi-database. The query walker agent may be a software agent that moves from node to node, to perform a query. This walk may be constrained, e.g., to follow an isometry measure, steepest gradient, or across nodes having certain characteristics.

Illustratively, the techniques described herein may be performed by hardware, software, and/or firmware, such as in accordance with the walker agent process 248, which may include computer executable instructions executed by the processor 220 (or independent processor of interfaces 210) to perform functions relating to the techniques described herein, e.g., in conjunction with routing process 244.

Specifically, in various embodiments, a device in a network receives a query walker agent configured to query information from a distributed set of devices in the network based on a query. The device executes the query walker agent to identify the query. The device updates state information of the executing query walker agent using local information from the device and based on the query. The device unloads the executing query walker agent after updating the state information. The device propagates the query walker agent to one or more of the distributed set of devices in the network, when the updated state information does not fully answer the query.

Operationally, the techniques herein introduce a new model whereby the network nodes themselves act as a collective database that can be queried as needed. Note that it would also be impractical in many implementations to maintain full database code to handle complex queries on any given node. For example, a typical constrained node may not have enough resources to execute a full SQL interpreter engine. Also, if such an engine was placed in the node, it would be limited to its day-1 capabilities, and may not be able to serve any unpredicted purpose.

By way of example, a user may want to query his or her IoT network with a complex request such as "all devices reporting a temperature within a certain range+location in a certain zone+a gradient with a neighbor of at least a certain value." Running such a query on any given node, however, may require more memory and CPU than the device can free up for the task, or capabilities that the resident code does not have, such as a protocol to discuss with the neighboring nodes.

FIGS. 4A-4H illustrate and example of performing a network query using a query walker agent, according to various embodiments. As noted above, the techniques herein introduce the concept of a query walker agent that can query the network itself, thereby transforming the network into effectively a database.

Figure 4A:
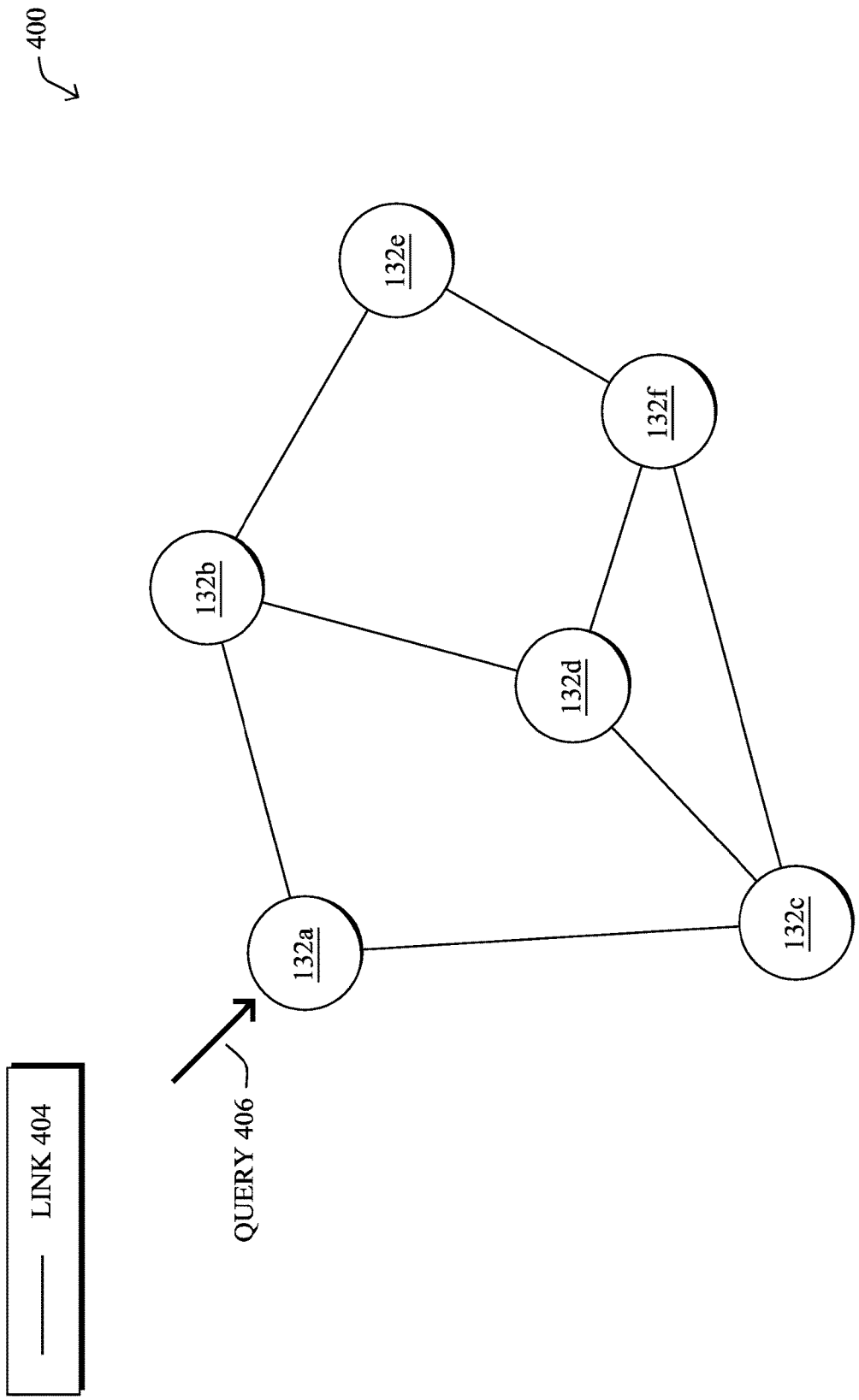
FIGS. 4A-4H illustrate and example of performing a network query using a query walker agent.

As shown in FIG. 4A, assume that there are nodes/devices 132a-132f within network portion 400 (e.g., a portion of network 100) are interconnected by links 404. In such a case, node 132a may receive a query 406 that may query some or all of the nodes in network portion 400 for one or more measurements, statuses, calculated values, combinations thereof, or the like. For example, query 406 may be an SQL-based query for certain data available from network portion 400. In particular, node 132a may maintain a listing of the information available from the nodes in network portion 400 and, in turn, map the SQL-based query to the available information.

Figure 4B:
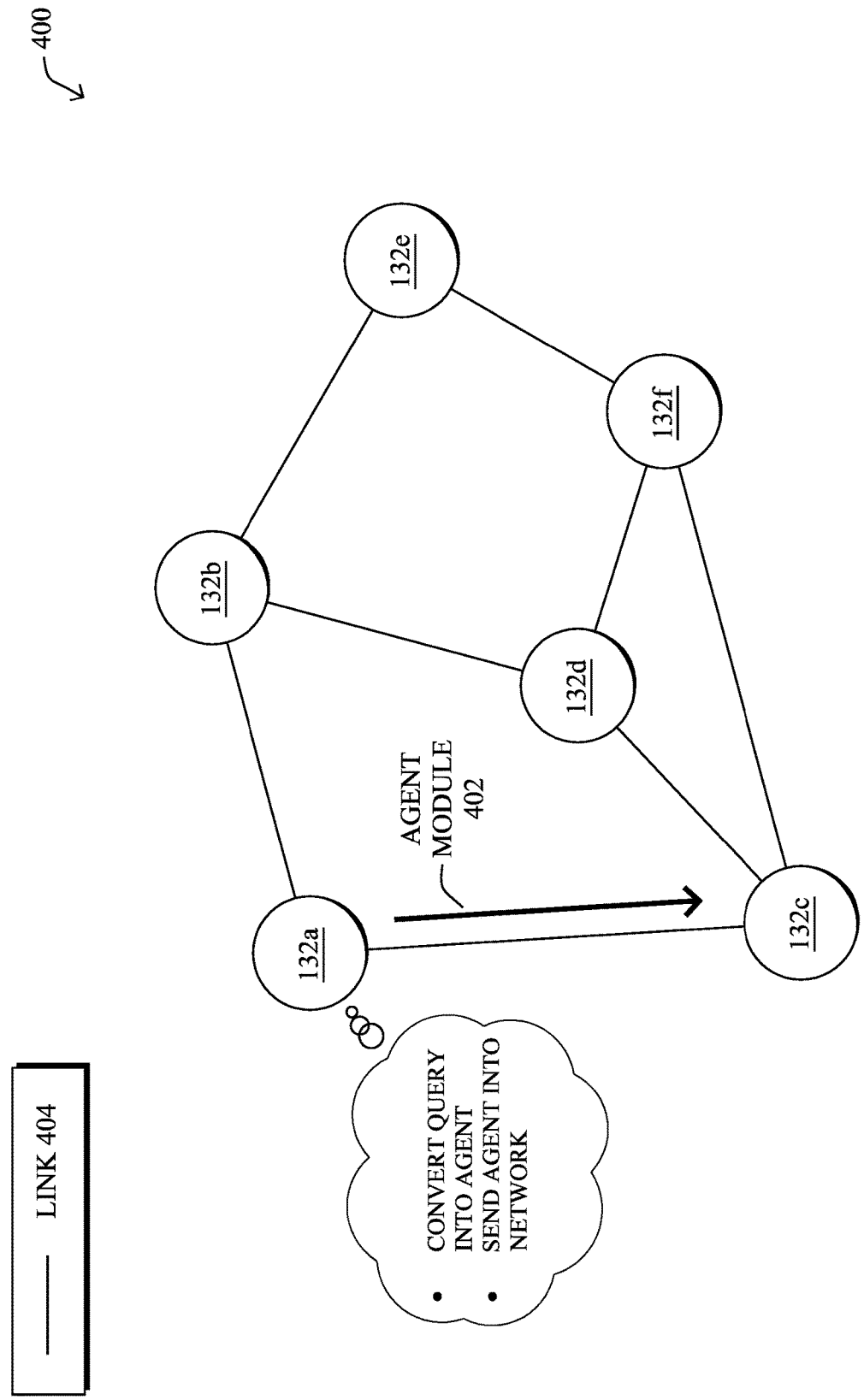
Figure 4C:
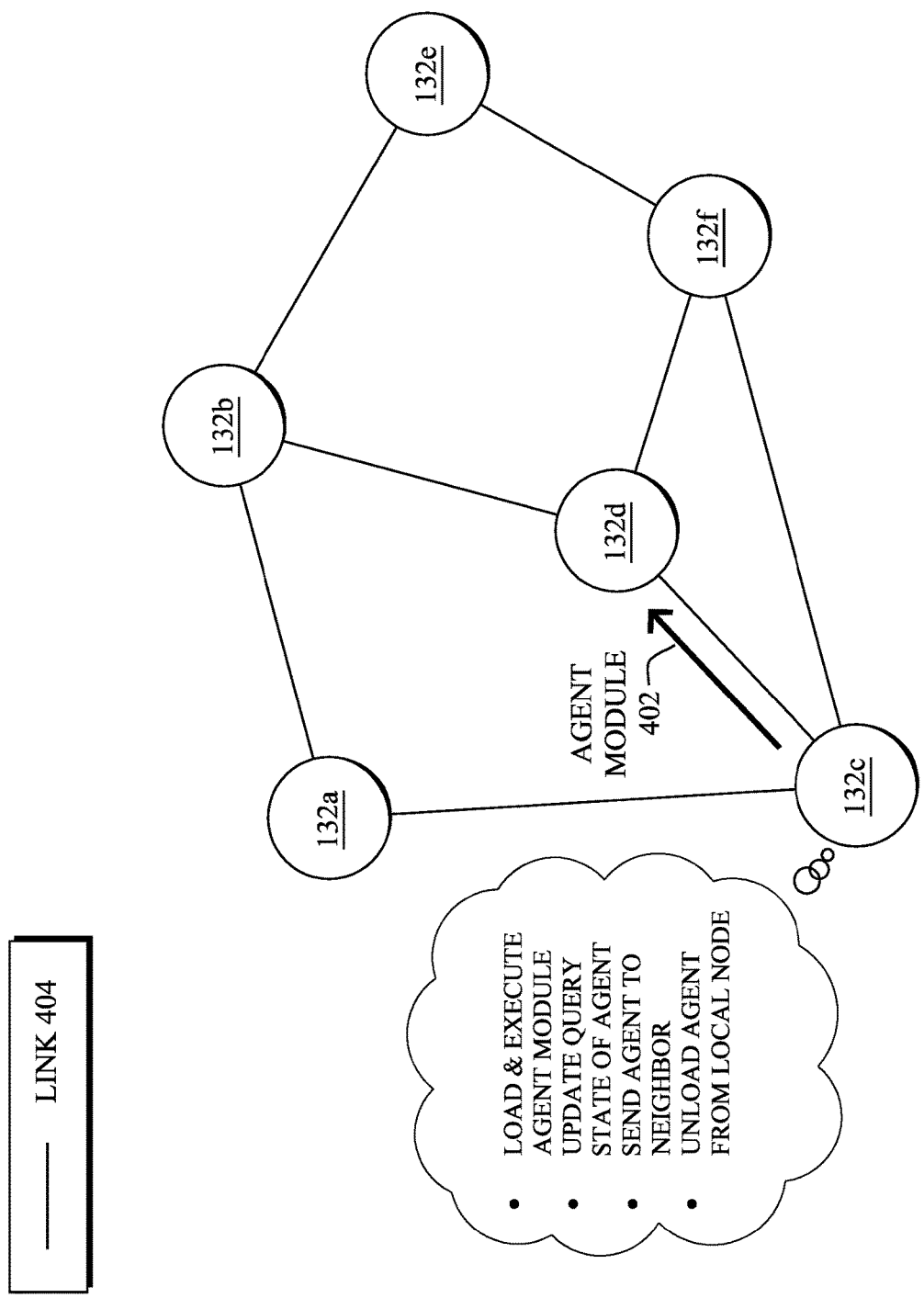
Figure 4D:
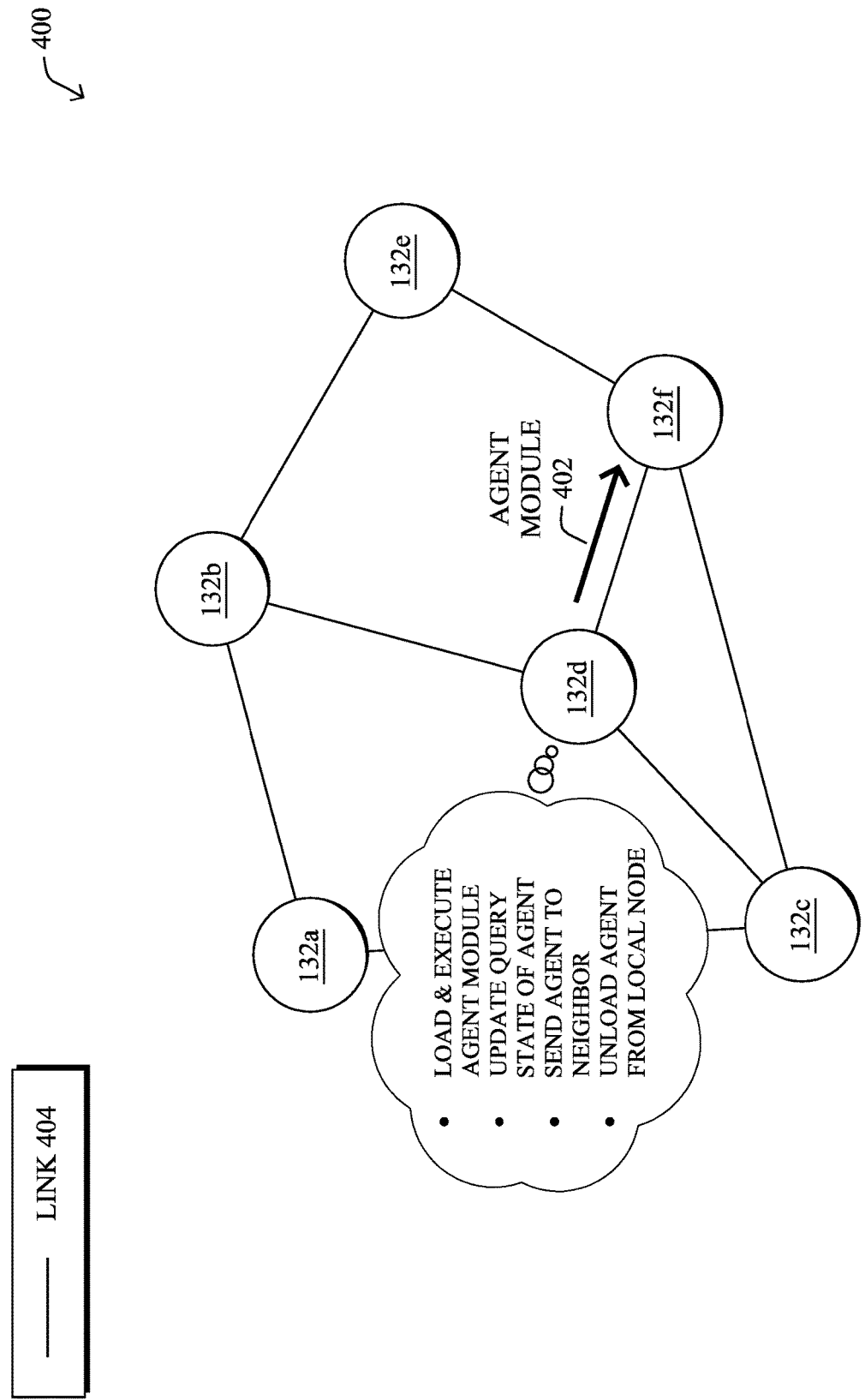
Figure 4E:
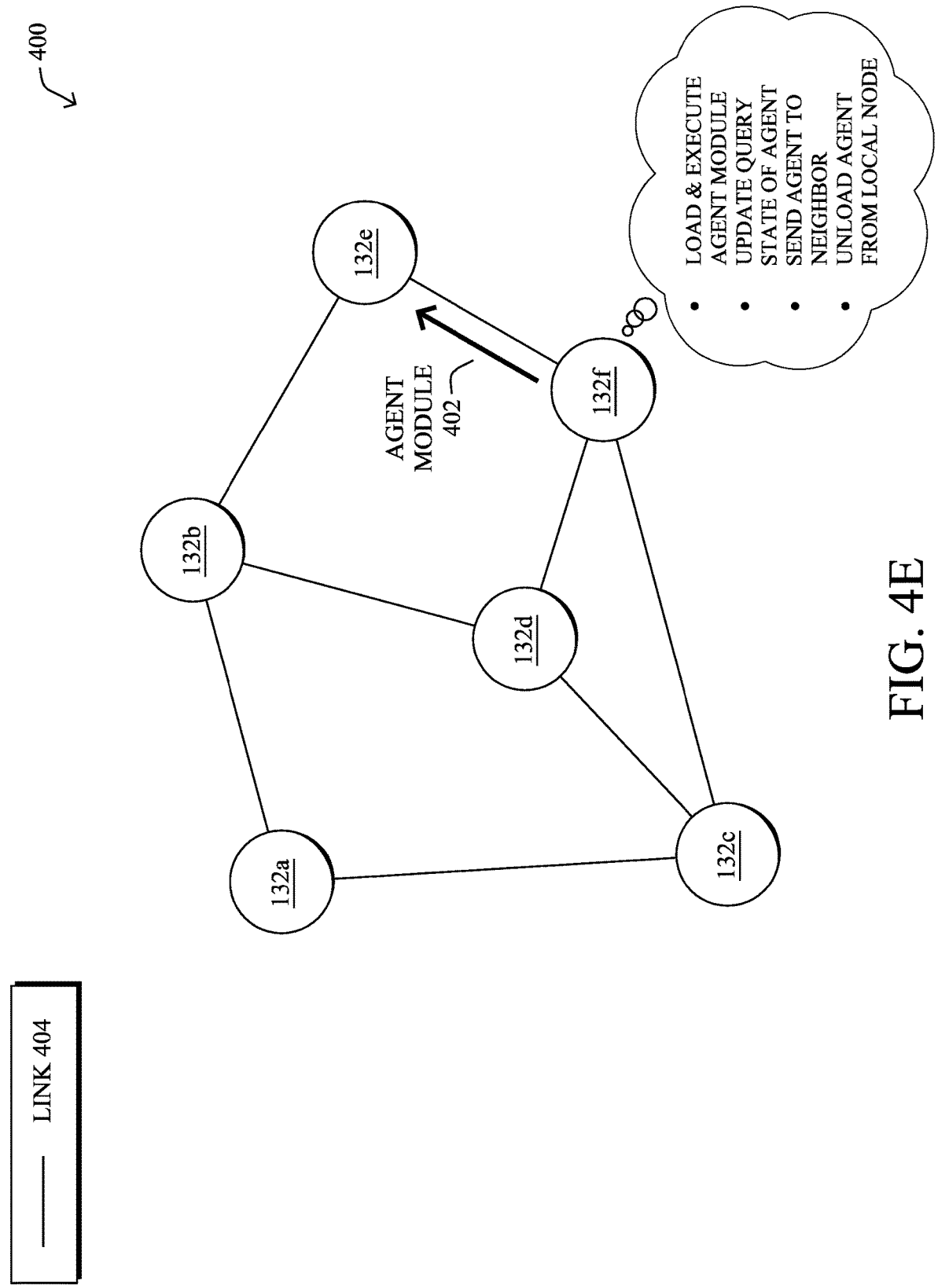
Figure 4F:
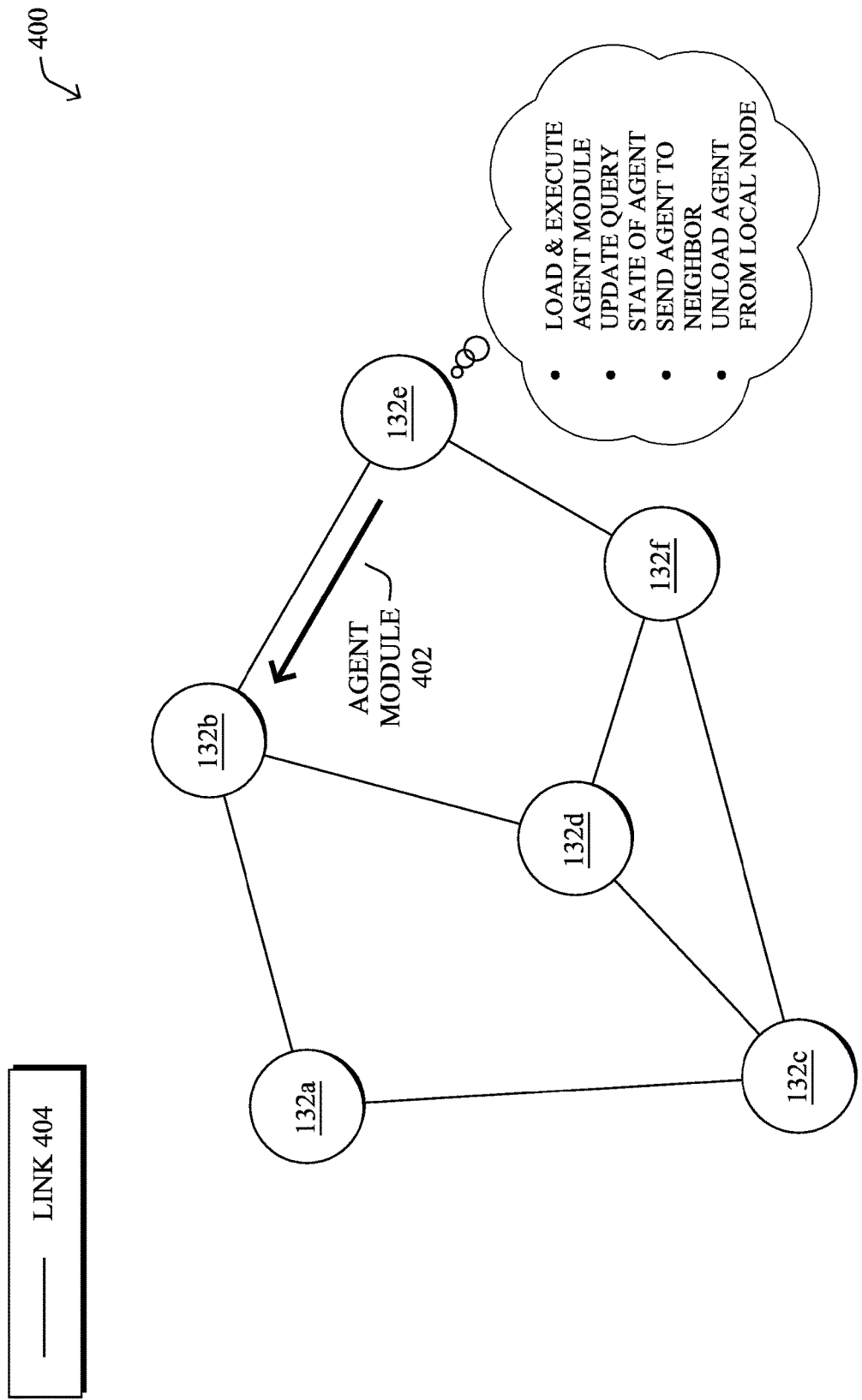
Figure 4G:
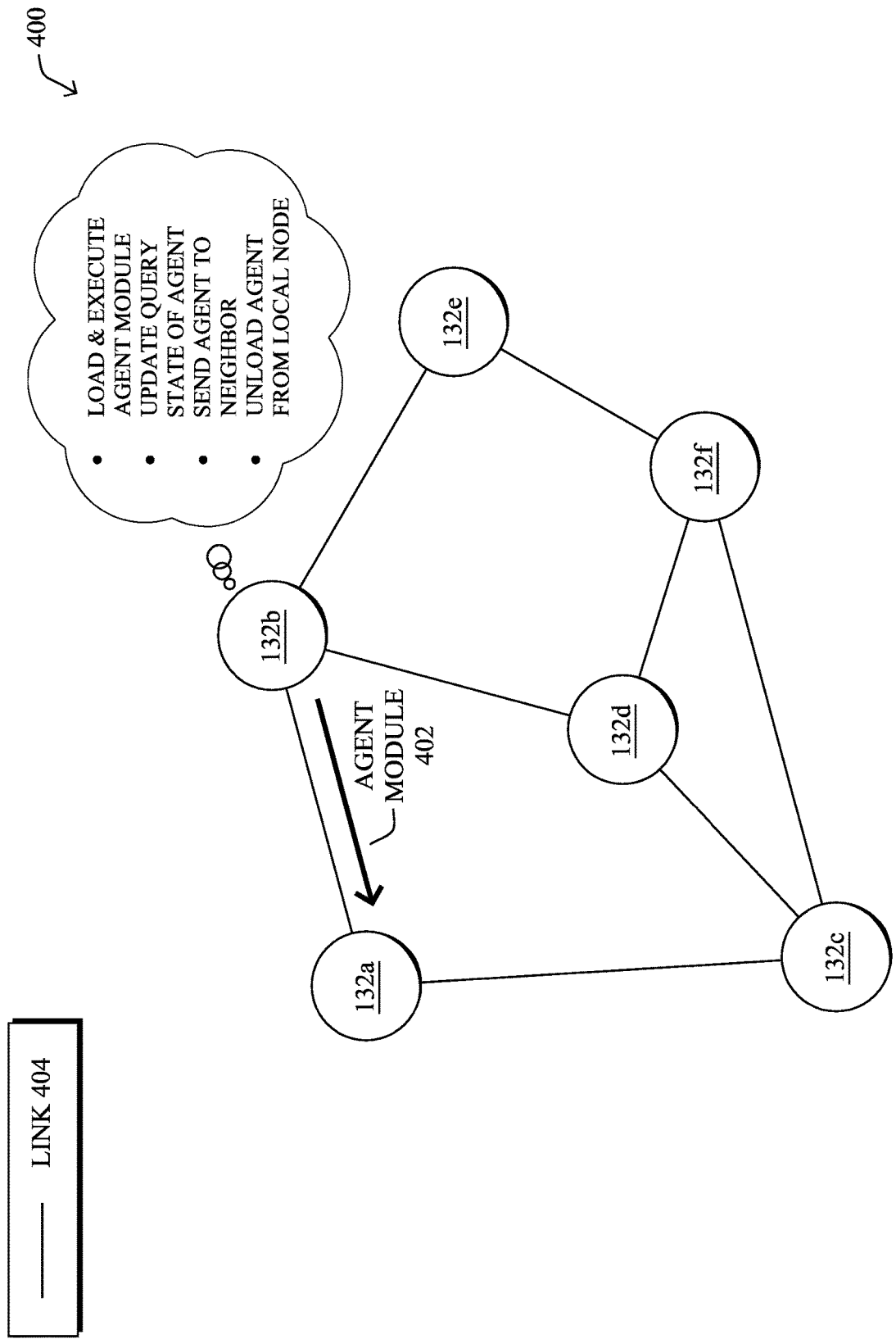

As shown in FIG. 4B, in response to receiving query 406, node 132a may translate query 406 into the specific executable code of query walker agent module 402. In turn, node 132a may send agent module 402 into network portion 400 for execution by any number of nodes in the network. For instance, the query may involve talking to neighboring nodes to compare things, which can be done by forking a child agent from agent module 402, which may not be possible by running code that normally resides on the node itself.

In FIGS. 4C-4G, each of nodes 132b-132f may receive the query walker agent module 402 at various times, load and execute the agent to update the state information of the agent, pass the agent module 402 on to other nodes in the network, and unload the agent from the memory of the local node.

In various embodiments, the propagation of query walker agent module 402 may be controlled by the parameters of query 406. For example, the query may seek a maximum gradient, or be propagated along isometric lines for a measured value (e.g., temperature, etc.) within predefined constraints, such as location. These control parameters may be used to limit the nodes that are being queried (e.g., the nodes that actually execute query walker agent module 402). As would be appreciated, doing so may save additional resources in the network, compared to sending all the data from the nodes to the cloud for later analysis.

Figure 4H:
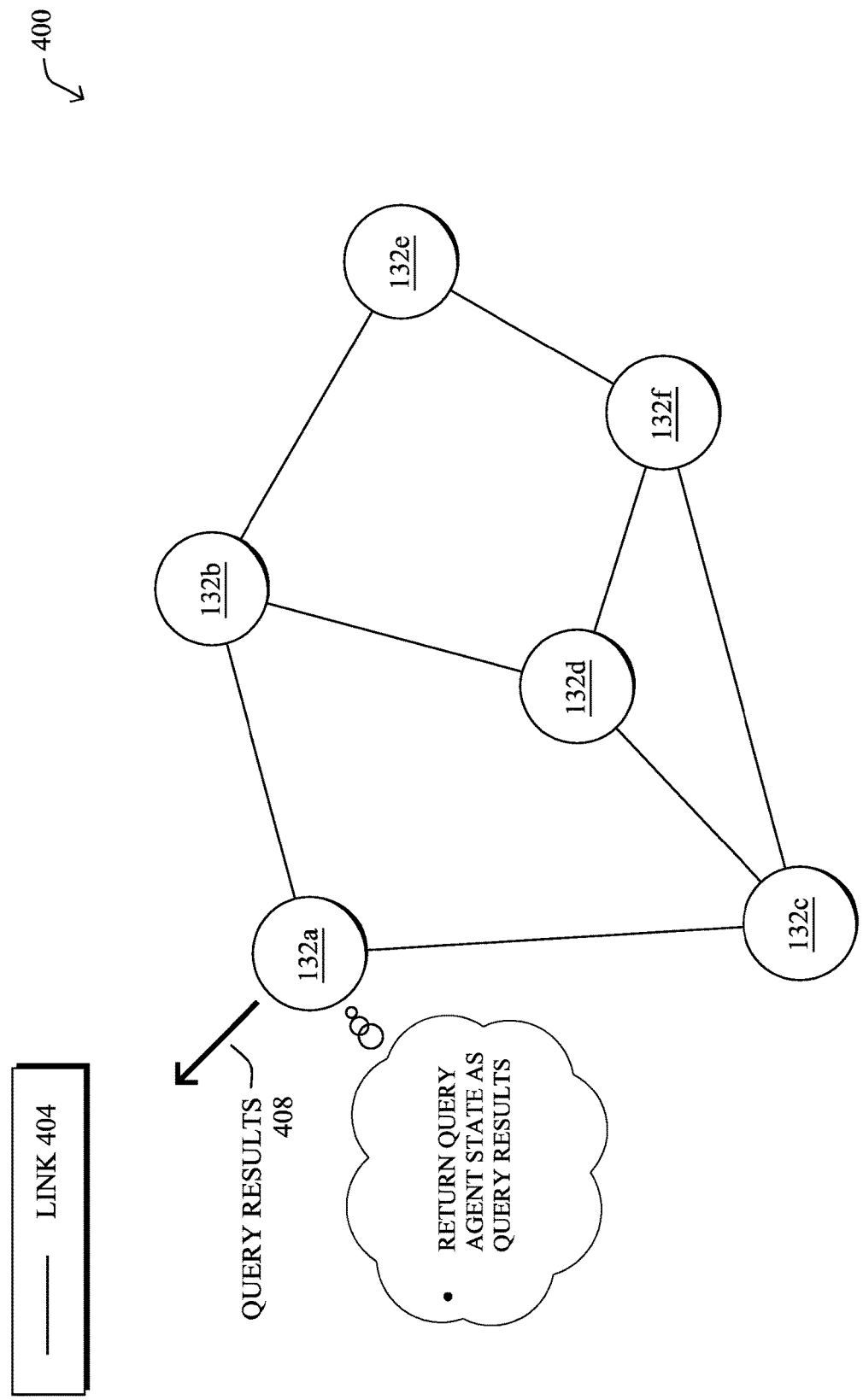

As shown in FIG. 4H, agent module 402 may be sent back to the originating node 132a, after a query terminating condition is met (e.g., after a certain amount of time has been met, after the target executing nodes have executed agent module 402, after a certain number of nodes 132 have executed agent module 402, etc.). From the state information updates that occur at each executing node, the state information in agent module 402 received by node 132a may include the results of the query. In turn, node 132a may extract the query results 408 from the state information of query walker agent module 402 and provide them to the device that issued query 406.

Alternatively, agent module 402 may trigger the nodes that match the query to report their data using their normal data paths in the network. In turn, only the data relevant to the query may be sent up to the cloud or other centralized database.

Figure 5:
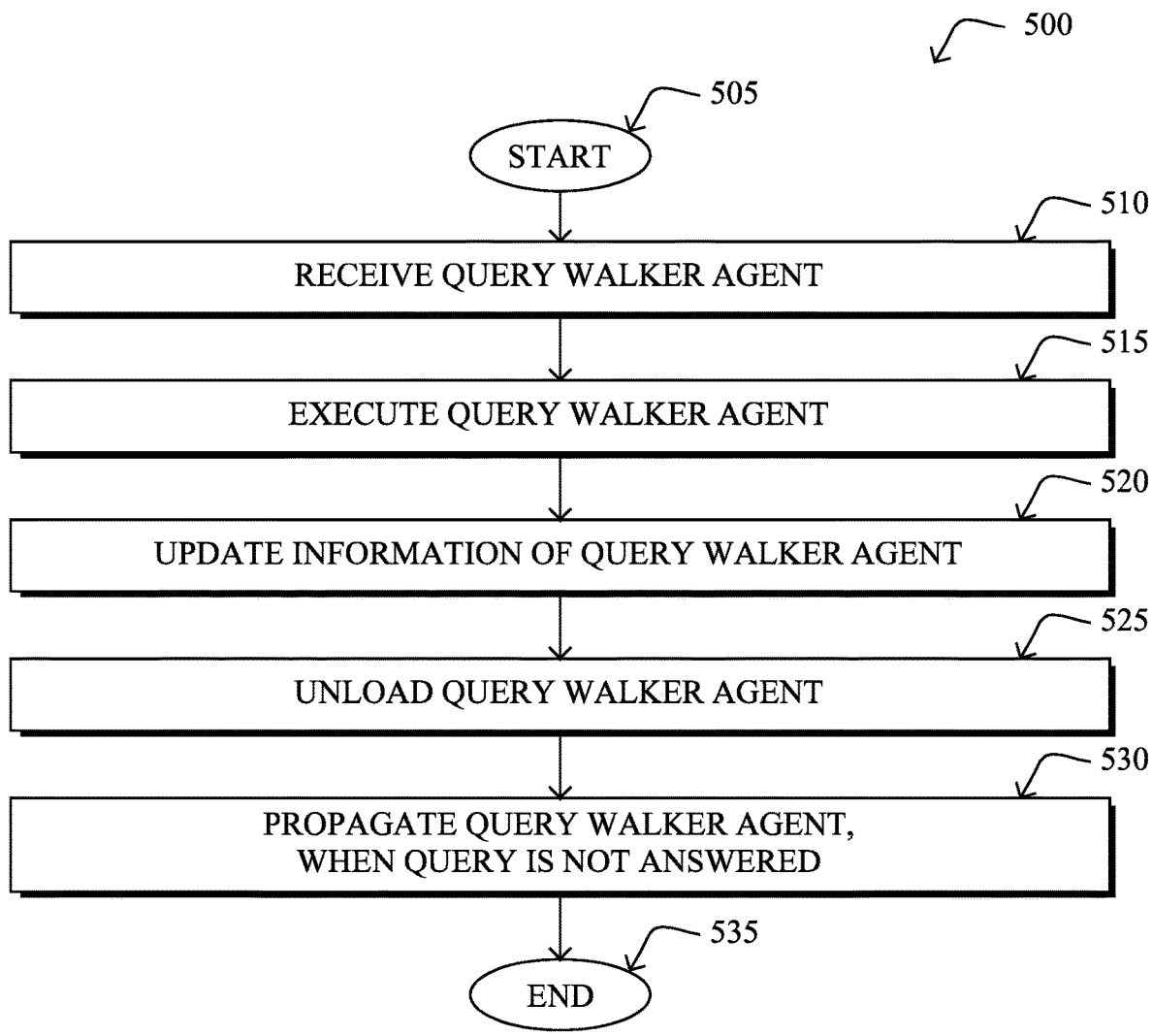
FIG. 5 illustrates an example simplified procedure for executing a query walker agent.

FIG. 5 illustrates an example simplified procedure for adaptively adjusting client characteristic collection for quality prediction, in accordance with one or more embodiments described herein. For example, a non-generic, specifically configured device (e.g., device 200) may perform procedure 500 by executing stored instructions (e.g., process 248). The procedure 500 may start at step 505 and continue on to step 510 where, as described in greater detail above, the device may receive a query walker agent. In general, the query walker agent may be configured to be executed by the device and to return an answer to a source of the query walker agent based on local information available from a distributed set of devices to which the device belongs.

At step 515, as detailed above, the device may execute the query walker agent to identify the query. Notably, the device may load and execute the query walker agent to determine which local information of the device may be needed to answer the query. For example, assume that the query requests a computed temperature gradient across the set of devices to which the device belongs. In such a case, the device may execute the query walker agent, to determine that a temperature reading from the device is needed.

At step 520, the device may update state information of the executing query walker agent using local information from the device and based on the query, as described in greater detail above. In some embodiments, the update to the state information may simply entail storing the local information from the device in the state information of the query walker agent. In other embodiments, the update may entail first using the local information of the device to perform a computation. For example, such a computation may be the calculation of a gradient (e.g., a temperature gradient along a path, etc.), isometric computation, or the like, in an attempt to answer the query. As would be appreciated, the result of the computation may fully answer the question or, alternatively, represent an intermediate answer (e.g., if more readings from other devices in the network are needed to fully answer the query, etc.). In turn, the device may update the state information of the query walker agent to reflect the results of the computation.

At step 525, as detailed above, the device may unload the query walker agent after updating the state information of the query walker agent. Notably, in many implementations, the device may have limited resources. Thus, after the query walker agent has completed its processing and captured the information needed from the device, the device may unload (e.g., close) the query walker agent, thereby freeing up resources on the device.

At step 530, the device may propagate the query walker agent and the updated state information to one or more of the distributed set of devices in the network, when the updated state information does not fully answer the query, as described in greater detail above. For example, if the query requires input from all or a subset of the distributed set of devices to fully answer the query, the device may propagate the query walker agent to one or more of the other devices in the set. Alternatively, if the query is answered by the updated state information, the device may notify the source of the agent of the result, either by sending the results directly to the source via an existing routing path or by propagating the agent with the updated state information back to the source. In some embodiments, as noted, the device may fork the query walker agent into a child agent for execution by one of the other devices, such as when only a portion of a computation or dataset is needed from the other device. In another embodiment, the device may also delete its copy of the query walker agent after propagating the agent to the other devices. Procedure 500 then ends at step 535.

Figure 6:
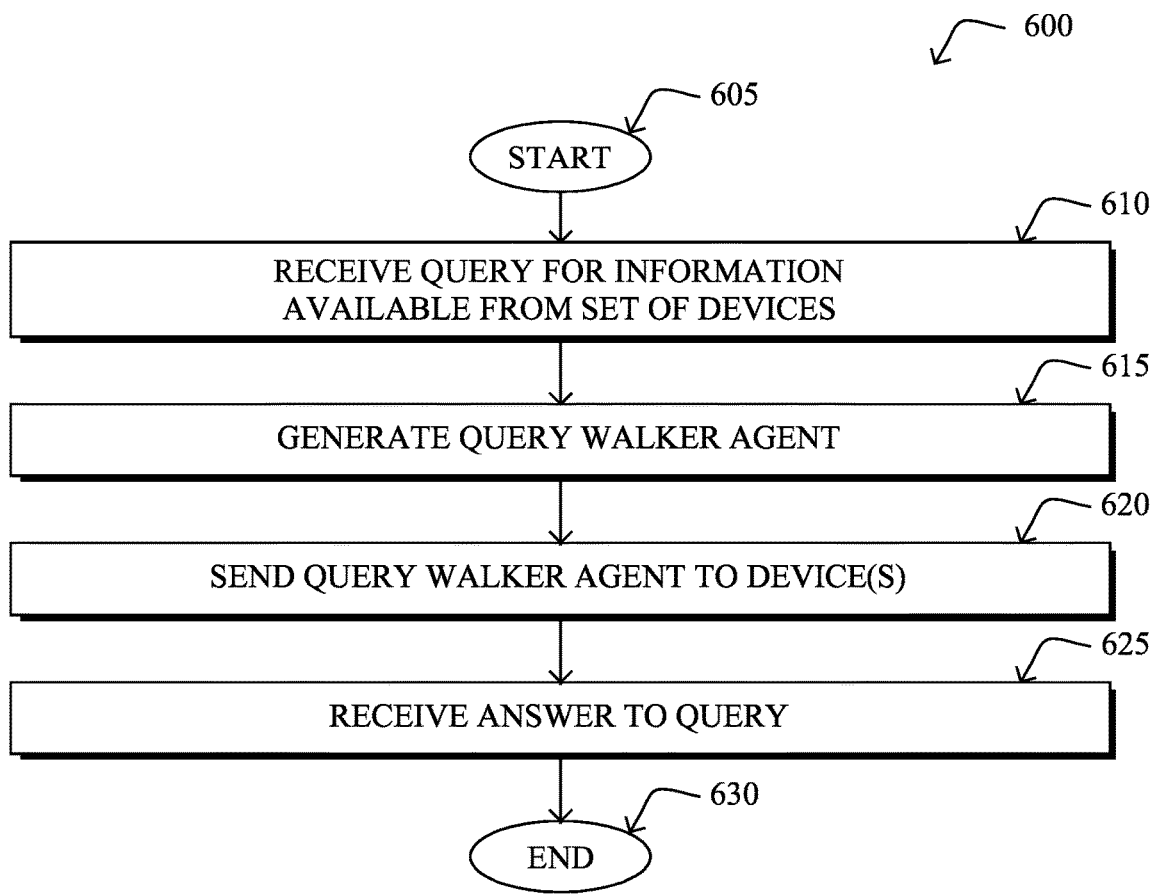
FIG. 6 illustrates an example simplified procedure for using a query walker agent to perform a distributed query in a network.

FIG. 6 illustrates an example simplified procedure for adaptively adjusting client characteristic collection for quality prediction, in accordance with one or more embodiments described herein. For example, a non-generic, specifically configured node may perform procedure 600 by executing stored instructions (e.g., process 248). The procedure 600 may start at step 605 and continue on to step 610 where, as described in greater detail above, the node may receive a query for information available from a distributed set of devices in the network. In some cases, the information may be raw data, such as sensor readings from a set of distributed sensors. In other cases, the information being queried may be a computed result based on the information available from the distributed devices (e.g., a computation that combines sensor readings, etc.). For example, the queried computation may be a gradient, isometric computation, or the like, across the information available from the various devices in the distributed set. Further, the query may also indicate a physical location or other condition that may be used to identify the set of distributed devices for the query (e.g., any or all devices in a specified physical location). In various embodiments, the query may be in the form of a structured language, such as SQL or the like.

At step 615, as detailed above, the node may generate a query walker agent configured for execution by the devices in the distributed set of devices to answer the query using the information available from the distributed set of devices. For example, the node may determine the device types of the distributed set of devices and generate an executable program for the devices, accordingly. Such an agent may be able to access the memories of the devices and, in many cases, perform computations based on the local information of the devices and the current state information of the agent.

At step 620, the node may send the query walker agent to at least one of the devices in the distributed set of devices, as described in greater detail above. In various embodiments, the at least one device updates state information of the query walker agent and propagates the query walker agent to one or more other devices of the distributed set. Said differently, a device that receives the query walker agent may execute the agent to update the state information of the agent using the local information of the device, before propagating the agent with the updated state information on to another one of the distributed set of devices.

At step 625, as detailed above, the node may receive an answer to the query from a particular one of the distributed set of devices based on the updated state information of the query walker agent. In particular, once the devices execute the agent and the updated state information of the agent answers the query, the current device may either send the final result back to the node or may send the entire agent back to the node with the updated state information. In various cases, the node may use the queried result locally and/or provide the resulting answer to another device, such as a user interface, a remote service (e.g., a cloud service), or to any other node/device that may issue queries to the node. For example, in one specific embodiment, the node may itself be a field area router, gateway, or other root node of the network in which the set of distributed devices reside. Procedure 600 then ends at step 630.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, save bandwidth and energy in the network nodes/devices by avoiding having them continuously report data to a central database. Instead, the techniques effectively convert the network itself into a distributed database that can be queries using walker agents, which is much more resilient.

While there have been shown and described illustrative embodiments that provide for query walker agents, it is to be understood that various other adaptations and modifications may be made within the spirit and scope of the embodiments herein. In addition, while certain query mechanisms are shown, such as SQL, other suitable query mechanisms may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a device in a network, a query walker agent configured to query information from a distributed set of devices in the network based on a query;
    executing, by the device, the query walker agent to identify the query;
    updating, by the device, state information of the executing query walker agent using local information from the device and based on the query, wherein updating the state information of the executing query walker agent comprises:
        retrieving, by the device, the local information from a memory of the device;
        performing, by the device, a computation using the state information of the query walker agent and the retrieved local information from the memory of the device; and
        storing, by the device, a result of the computation in the state information of the query walker agent;
    unloading, by the device, the executing query walker agent after updating the state information; and
    propagating, by the device, the query walker agent with the updated state information to one or more of the distributed set of devices in the network, when the updated state information does not fully answer the query.

2. The method as in claim 1, wherein propagating, by the device, the query walker agent with the updated state information to one or more of the distributed set of devices in the network comprises:
    forking, by the device, the query walker agent into a child agent; and
    sending, by the device, the child agent to one of the distributed sets of devices, wherein the child agent is configured to obtain a portion of the information needed to answer the query.

3. The method as in claim 1, wherein the query comprises a gradient or isometric computation of the information from the distributed set of devices in the network.

4. The method as in claim 3, wherein the distributed set of devices are located in a particular physical area specified by the query.

5. The method as in claim 1, further comprising:
    sending, by the device, the query walker agent and updated state information to a source of the query walker agent, when the updated state information fully answers the query.

6. The method as in claim 1, further comprising:
    sending, by the device, data indicative of the updated state information of the query walker agent to a source of the query walker agent via an existing routing path to the source, when the updated state information fully answers the query.

7. The method as in claim 1, wherein the query walker agent is generated by a source node in the network based on the query.

8. A method comprising:
    receiving, at a node in a network, a query for information available from a distributed set of devices in the network;
    generating, by the node, a query walker agent configured for execution by the devices in the distributed set of devices to answer the query using the information available from the distributed set of devices;
    sending, by the node, the query walker agent to at least one of the devices in the distributed set of devices, wherein the at least one device updates state information of the query walker agent and propagates the query walker agent to one or more other devices of the distributed set, the at least one device updating the state information by retrieving local information from a memory of the device, performing a computation using the state information of the query walker agent and the retrieved local information from the memory of the device, and storing a result of the computation in the state information of the query walker agent; and
    receiving, at the node, an answer to the query from a particular one of the distributed set of devices based on the updated state information of the query walker agent.

9. The method as in claim 8, wherein the query comprises a gradient or isometric computation of the information from the distributed set of devices in the network.

10. The method as in claim 9, wherein the distributed set of devices are located in a particular physical area specified by the query.

11. The method as in claim 9, wherein the query comprises a SQL-based query.

12. An apparatus, comprising:
    one or more network interfaces to communicate with a network;
    a processor coupled to the network interfaces and configured to execute one or more processes; and
    a memory configured to store a process executable by the processor, the process when executed configured to:
        receive a query walker agent configured to query information from a distributed set of devices in the network based on a query;
        execute the query walker agent to identify the query;
        update state information of the executing query walker agent using local information from the device and based on the query, wherein the apparatus updates the state information of the executing query walker agent by:
            retrieving the local information from a memory of the device;

performing a computation using the state information of the query walker agent and the retrieved local information from the memory of the device; and storing a result of the computation in the state information of the query walker agent;

unload the executing query walker agent after updating the state information; and propagate the query walker agent with the updated state information to one or more of the distributed set of devices in the network, when the updated state information does not fully answer the query.

13. The apparatus as in claim 12, wherein the apparatus propagates the query walker agent with the updated state information to the one or more of the distributed set of devices in the network by:

forking the query walker agent into a child agent; and sending the child agent to one of the distributed sets of devices, wherein the child agent is configured to obtain a portion of the information needed to answer the query.

14. The apparatus as in claim 12, wherein the query comprises a gradient or isometric computation of the information from the distributed set of devices in the network.

15. The apparatus as in claim 14, wherein the distributed set of devices are located in a particular physical area specified by the query.

16. The apparatus as in claim 12, wherein the process when executed is further configured to:

delete the query walker agent from the apparatus, after propagating the query walker agent and updated state information to the one or more devices in the distributed set of devices.

17. The apparatus as in claim 12, wherein the process when executed is further configured to:

send data indicative of the updated state information of the query walker agent to a source of the query walker agent via an existing routing path to the source, when the updated state information fully answers the query.

18. The apparatus as in claim 12, wherein apparatus comprises a sensor and the local information comprises a sensor reading.

* * * * *